United States Patent [19]

Chen et al.

[11] Patent Number: 5,452,165
[45] Date of Patent: Sep. 19, 1995

[54] CLOSE PACKED MAGNETIC HEAD LINEAR ARRAY

[75] Inventors: Mao-Min Chen; Kochan Ju; Mohamad T. Krounbi, all of San Jose; Denny D. Tang, Saratoga; Po-Kang Wang, San Jose, all of Calif.

[73] Assignee: International Business Machines Corporation, Armonk, N.Y.

[21] Appl. No.: 214,902

[22] Filed: Mar. 16, 1994

[51] Int. Cl.⁶ .............................................. G11B 5/29
[52] U.S. Cl. .................................... 360/121; 360/126
[58] Field of Search ................................ 360/121, 126

[56] References Cited

U.S. PATENT DOCUMENTS

| | | | |
|---|---|---|---|
| 3,662,119 | 5/1972 | Romankiw et al. | 179/110.2 C |
| 4,149,204 | 4/1979 | Marino et al. | 360/119 |
| 4,701,820 | 10/1987 | McClure | 360/125 |
| 4,738,021 | 4/1988 | McClure | 29/603 |
| 4,811,146 | 3/1989 | Niwa | 360/119 |
| 4,819,113 | 4/1989 | Kubota et al. | 360/126 |
| 4,901,178 | 2/1990 | Kobayashi et al. | 360/126 |
| 4,975,791 | 12/1990 | Eggebeen | 360/77.01 |
| 5,016,342 | 5/1991 | Pisharady | 360/121 X |
| 5,132,859 | 7/1992 | Andricacos et al. | 360/113 |
| 5,134,534 | 7/1992 | Sasaki | 360/126 |
| 5,237,476 | 8/1993 | Bischoff | 360/126 |
| 5,296,992 | 3/1994 | Abe | 360/126 |

OTHER PUBLICATIONS

J. M. Coutellier, H. Magna, X. Pirot, "A 384 Track Fixed Recording Head," *Digest of the Intermag Conference 1992*, Paper D-P09, Apr. 13-16, 1993, St. Louis, Mo., Library of Congress No. 72-649866.

*Primary Examiner*—A. J. Heinz
*Attorney, Agent, or Firm*—Baker, Maxham, Jester & Meador

[57] ABSTRACT

The present invention includes a plurality of thin film magnetic heads which are arranged in a linear array with a spacing D between adjacent heads. The pole pieces of the magnetic heads are positioned in a side by side relationship in contrast to the normal pancake type of magnetic head. The linear array is angled at a skew angle $\theta$ with respect to the direction of travel of the magnetic medium. The track pitch is then $D \sin \theta$. The track width is substantially equal to the thickness of the pole tips P1T and P2T of the magnetic heads. This thickness can be in the order of 3 $\mu$m. With such a pole tip thickness the track pitch of each magnetic head in the linear array can be 3–4 $\mu$m. A plurality of narrow data tracks can then be provided with minimum pitch by a corresponding number of magnetic heads. The write signals are simultaneously fed to the heads or the read signals are simultaneously fed to the heads. This allows high data rates to be processed. The invention also provides different azimuth between adjacent heads to minimize cross talk between the tracks caused by track misregistration. Additional magnetic heads can be employed for servo control as needed.

23 Claims, 7 Drawing Sheets

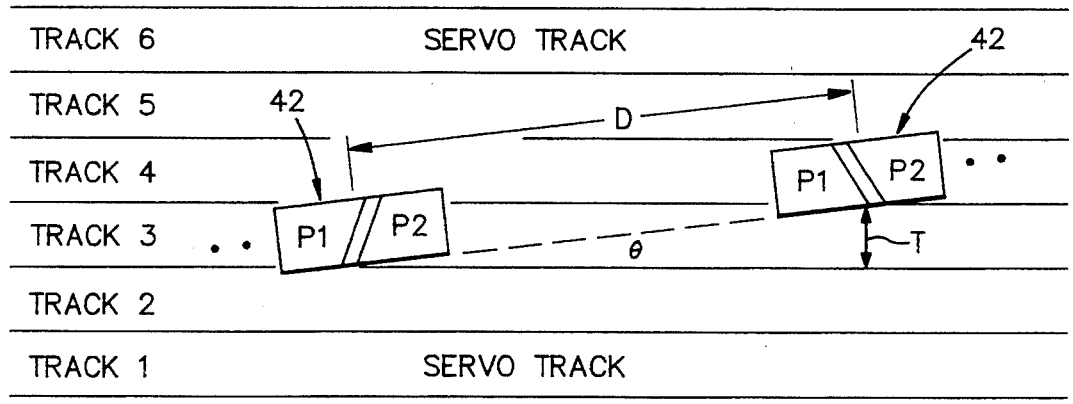
FIG. 12
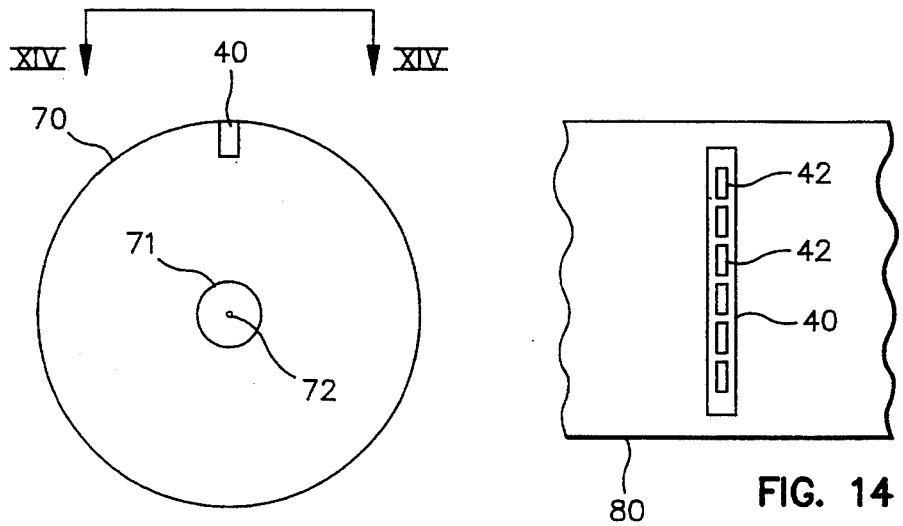
FIG. 13
FIG. 14
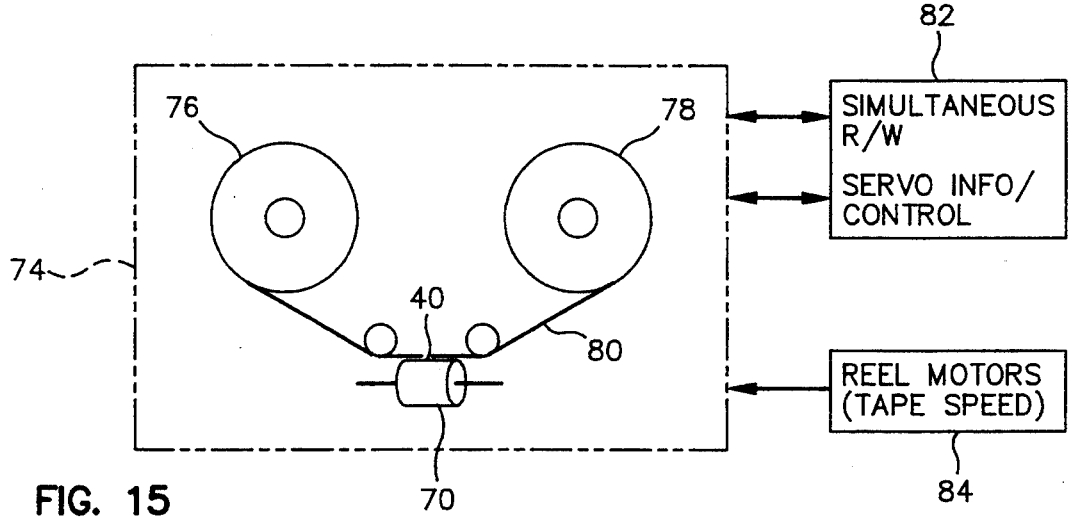
FIG. 15

CLOSE PACKED MAGNETIC HEAD LINEAR ARRAY

BACKGROUND OF THE INVENTION

1. Field of the Invention

The present invention relates to a thin film magnetic head array and more particularly to magnetic heads which are closely packed in a linear array for multiplexing data to achieve high data rates.

2. Description of the Related Art

Some read and or write applications require a high data rate (Gb/s). An example is high definition television (HDTV) which requires a data rate of approximately 1.2 Gb/s. Magnetic tape used for HDTV may include a number of tracks varying from 4 to 32. Another example of a read/write application which requires a high data rate is a data library which stores large volumes of data on magnetic disks. The only practical way to handle high data rates is to multiplex the data onto a plurality of tracks using a thin film magnetic head linear array. All of the magnetic heads in the array will either write simultaneously or read simultaneously to achieve the multiplexing of data. The multiplexed data can be transduced with either magnetic tape or magnetic disk media.

High data rates cannot be effectively achieved without using thin film technology to construct magnetic transducing heads. Thin film technology allows magnetic heads to be small, effective and cheap to manufacture using batch techniques. The problem is that present day thin film magnetic heads have a large footprint with significant lateral spacing which increases track pitch, thereby reducing the number of tracks which can be written per unit of medium area. Another problem with prior art thin film magnetic heads is that when they are arranged in a linear array, their off-track performance is very poor. The off-track performance problem is much more serious with a linear array of magnetic heads than it is with a single magnetic head. This is because of the long dimension of the array. A slight change in temperature will cause an unacceptable movement of the magnetic heads relative to the tracks which results in unacceptable sidewriting or sidereading. This is known as thermal induced track misregistration (TMR). To correct this problem the magnetic media must have guard bands between the data tracks which limits the track density.

The typical read/write inductive thin film magnetic head has a "pancake" type structure. The pancake type head has top and bottom pole layers. Between the pole layers is a multi-turn spiral coil layer and several insulation layers. The top and bottom pole layers terminate in pole tips which are separated by a gap layer. Because of the lateral dimension of the coil layer, the pancake type head has a footprint which is at least 300 μm wide. When only one thin film magnetic head is employed, the track width can be in the order of 3 μm. This is because with today's technology the pole tips can be defined with narrow widths. However, when a number of pancake heads are arranged in a side-by-side relationship to form a linear array, the track pitch takes on the lateral spacing between the thin film magnetic heads. Typically, the head-to-head spacing in pancake head arrays is on the order of 300 μm. This means that track pitch on the magnetic media must likewise be about 300 μm when pancake heads are employed in a magnetic head linear array. Such a pitch is unacceptable.

J. M. Coutillier, et al. in an article entitled "A 384 Track Fixed Recording Head" published in Digest of Intermag 1992, paper DP-09, show using an N×M matrix of heads on a single substrate. The heads are constructed to provide narrow track widths, while the rows are alternately offset to reduce track pitch. Nonetheless, the track pitch is still 216 μm. It is desirable for present day applications that track pitch be much less than 216 μm.

SUMMARY OF THE INVENTION

The present invention provides a close packed thin film magnetic head linear array which can achieve high data rates and high data densities required by present day applications, such as HDTV. The present invention can achieve track widths in the order of 4–5 μm. The invention also provides track pitch which is approximately equal to the track width. Further, the thermal induced track misregistration (TMR) problem is met and solved by the invention, which may also minimize or eliminate the need for guard bands.

In contrast to the pancake type head, the present invention employs a side-by-side P1/G/P2 arrangement for each thin film magnetic head, where P1 refers to a first pole piece, G refers to a gap member, and P2 refers to a second pole piece. A conductor is wrapped around each pole piece to provide a large number of turns. Typically 60 turns can be provided to produce a large flux intensity for the read or write operations. A thin film magnetic head with pole pieces constructed in this manner is fully described in U.S. Pat. No. 3,662,119.

The footprint of the side by side magnetic head is primarily dictated by the widths of the pole pieces which, when combined, total about 100 μm. In the present invention, the magnetic heads are arranged with a P1/G/P2 pole tip pattern for each magnetic head, such that the magnetic heads are aligned in a linear array P1/G/P2 ... P1/G/P2 with an equal distance (D) between each gap (G) layer. The distance D is the footprint of each head. According to the invention the linear array is positioned at a skew angle $\theta$ with respect to the data track direction of a magnetic medium, such as magnetic tape or a magnetic disk. The skew angle $\theta$ and the head spacing D determine the track pitch (T) where $T = D \sin \theta$. Accordingly, T is approximately the same as track width, which is approximately equal to the thickness of the individual P1 and P2 pole layers.

The invention also provides different azimuths between adjacent heads so as to minimize cross talk between the tracks. With this arrangement, guard bands can be eliminated and, if desired, a portion of the side track can be overridden by an adjacent trailing head to form a written track width which is narrower than the thickness of the pole tips. With azimuth discrimination, significant improvement in off-track performance can be achieved. Accordingly, thermal induced track misregistration (TMR) will not have a serious impact on performance. Further, the invention can employ servo data and servo components for selectively changing the skew angle $\theta$, which in turn changes the track pitch. Such a change will correct slight track misregistrations or can be used to change the track periodicity, if desired. The present invention enables the linear array to be easily used in either a magnetic tape drive or a magnetic disk drive.

An object of the present invention is to provide a close packed thin film magnetic head linear array for achieving high data rates.

Another object is to achieve the foregoing object along with achieving a low track pitch.

A further object is to achieve any of the foregoing objects as well as achieving narrow track widths.

Yet another object is to achieve any of the foregoing objects as well as achieving significant improvement in off-track performance.

Still another object is to achieve any of the foregoing objects as well as achieving easy adjustment of track pitch or adjustment for track misregistration.

Still a further object is to achieve any of the foregoing objects and easily adapt the invention for employment as an inductive read/write head or as a merged read/write head.

Still another object is to achieve any of the foregoing objects as well as employing a magnetic head array which is constructed by thin film batch techniques.

Still a further object is to achieve any of the foregoing objects as well as easily adapting the invention for use with magnetic tape media or magnetic disk media.

Still another object is to achieve any of the foregoing objects as well as easily adapting the invention for use with either a magnetic tape drive or a magnetic disk drive.

Other objects will become apparent when considered in light of the following description of the invention.

BRIEF DESCRIPTION OF THE DRAWINGS

FIG. 12 is a schematic illustration of a plurality of heads of the present magnetic head linear array positioned at a skew angle $\theta$ with respect to a plurality of tracks on magnetic media.

FIG. 13 is a top view of a stationary drum employing a present magnetic head linear array.

FIG. 14 is a side view taken along plane XIV—XIV of FIG. 13.

FIG. 15 is a schematic illustration of a tape drive employing the tape drum of FIG. 13.

DETAILED DESCRIPTION OF THE PREFERRED EMBODIMENTS

Figure 1:
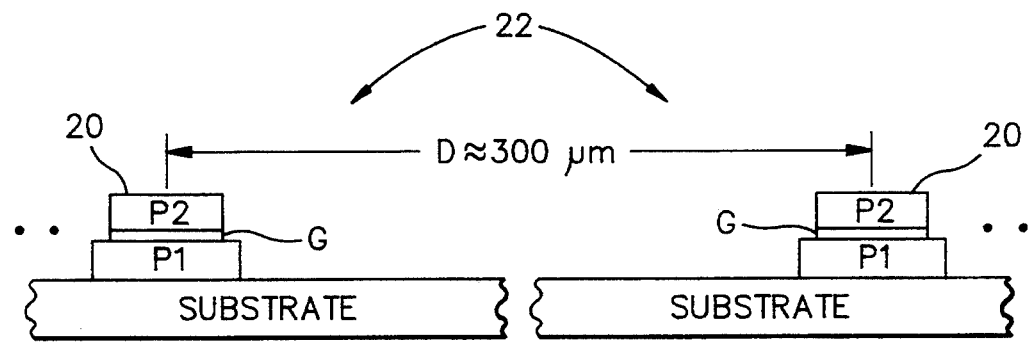
FIG. 1 is a schematic illustration, not to scale, of a plurality of prior art pancake type thin film magnetic heads arranged in a prior art linear array.
Figure 3:
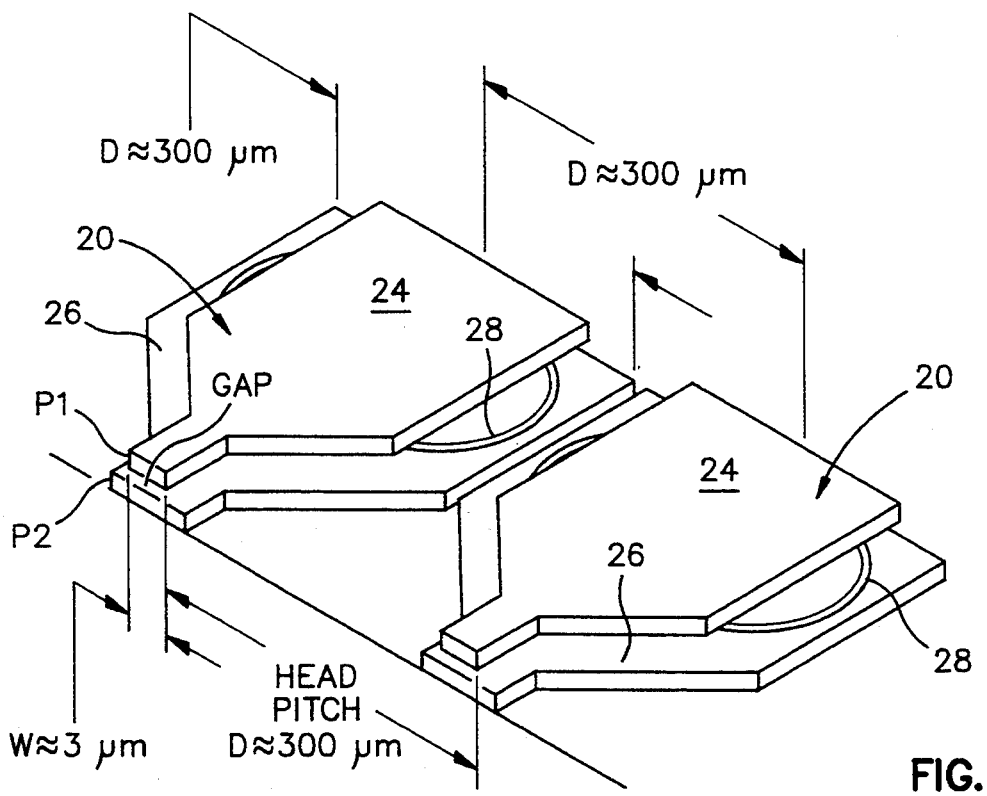
FIG. 3 is an isometric schematic illustration of a pair of pancake type thin film magnetic heads arranged in a prior art linear array.
Figure 5:
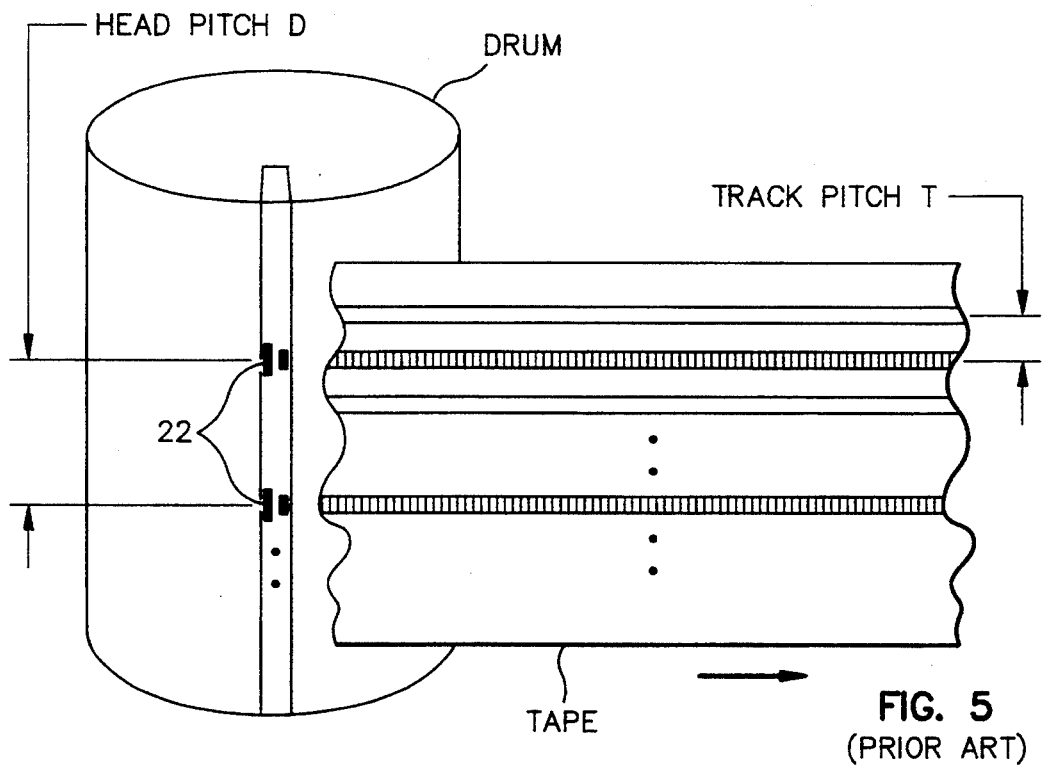
FIG. 5 is a schematic isometric illustration of a multi-track magnetic tape and drum, the drum having a prior art magnetic head linear array.
Figure 6:
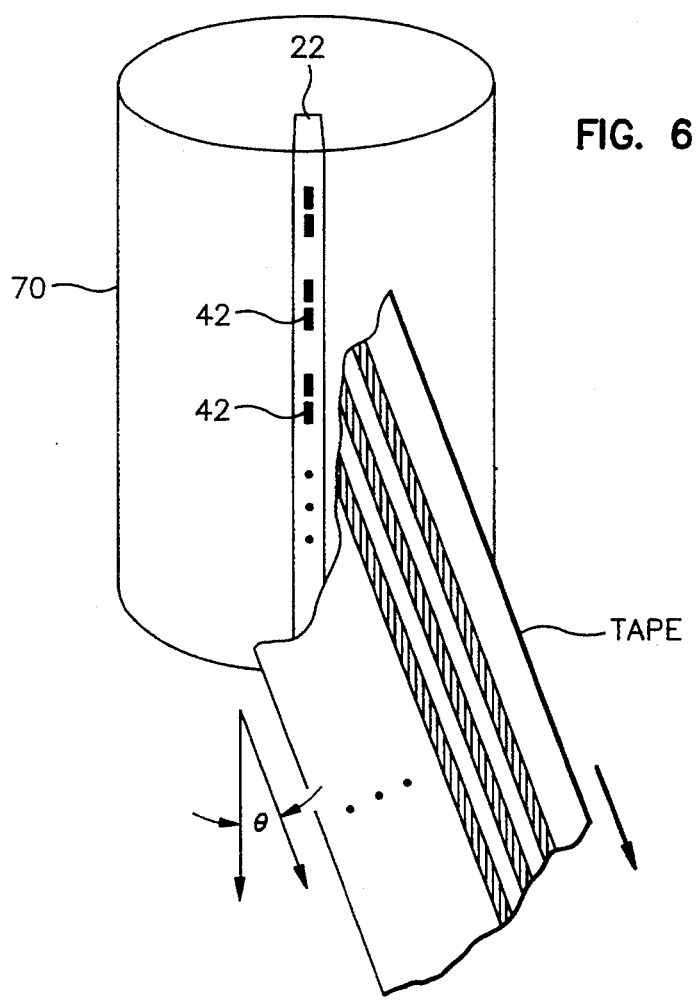
FIG. 6 is a schematic isometric illustration of a multi-track magnetic tape and drum, the drum comprising the present magnetic head linear array.

Referring to the drawings wherein like reference numerals designate like or similar parts throughout the several views, there is illustrated in FIGS. 1, 3 and 5 prior art pancake type thin film magnetic heads 20 which are arranged in a spaced relationship, separated by a distance D along a linear array 22. The number of magnetic heads 20, less the number used for servo tracks, will determine the number of data tracks to be processed on magnetic media. Each magnetic head 20 includes pole layers P1 and P2 which form pole pieces 24 and 26 whose forward portions ("pole tips") P1T and P2T extend into the pole tip region. The layer of material forming the gap G is co-extensive with the pole tips. As shown in FIG. 3, the pole pieces 24 and 26 are positioned one on top of the other. Between the pole pieces 24 and 26 are one or more turns of a conductor layer 28 as well as several insulation layers (not shown). The lateral dimension of the conductor layer 28 primarily dictates the spacing between (pitch) of the magnetic heads which is at least 300 μm. Likewise, the pitch of tracks written by the linear array is in the order of 300 μm ignoring any guard bands between the tracks. Because of the pancake arrangement of the pole layers P1 and P2, there is no way to arrange the magnetic heads 20 to achieve a track pitch which is less than the footprint of an individual head.

Figure 2:
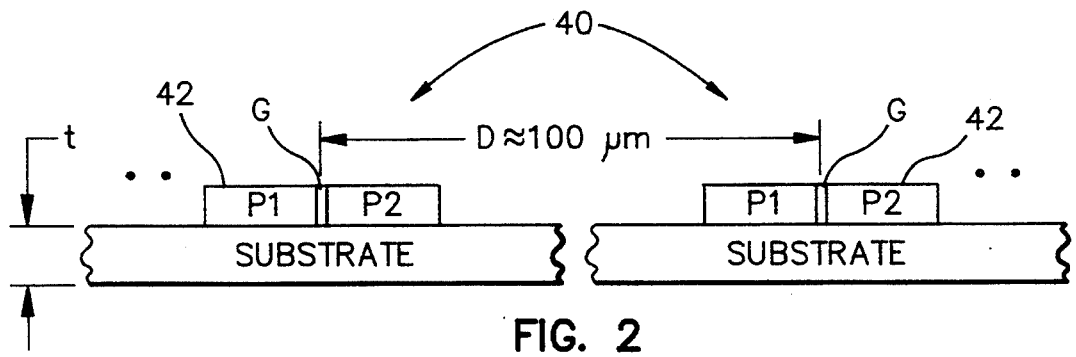
FIG. 2 is a schematic illustration, not to scale, of the present invention showing a plurality of thin film magnetic heads with side-by-side pole tips arranged in a linear array.
Figure 4:
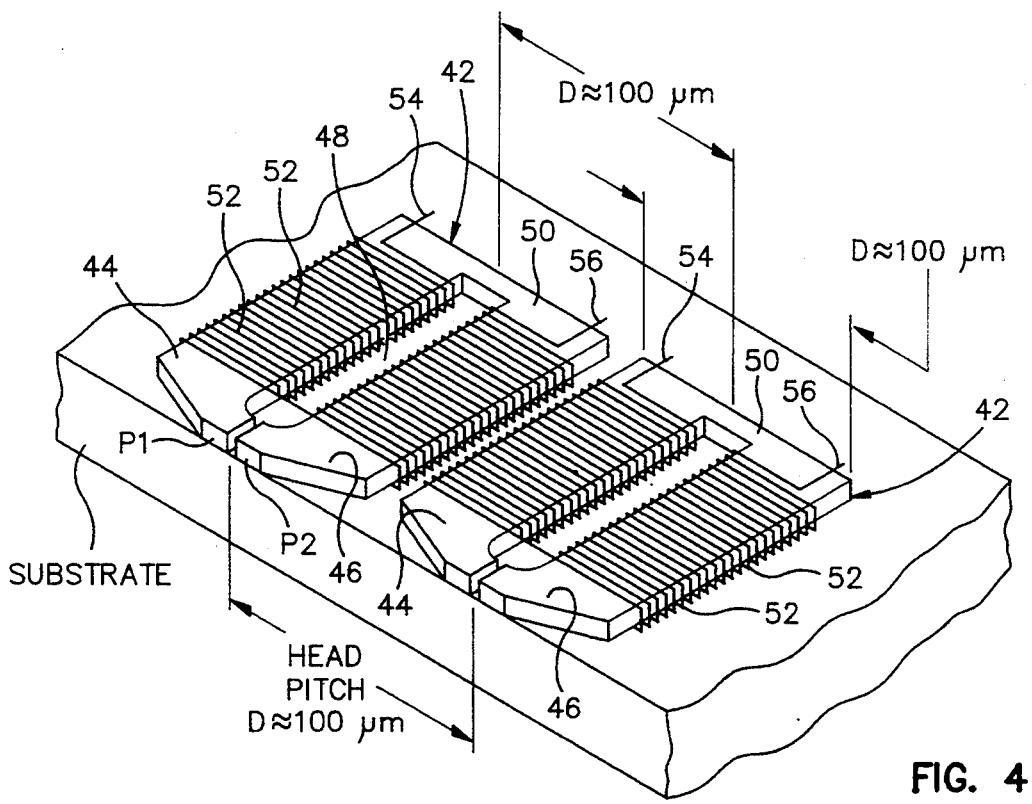
FIG. 4 is an isometric schematic illustration of a pair of side by side type of thin film magnetic heads arranged in the present linear array.
Figure 7:
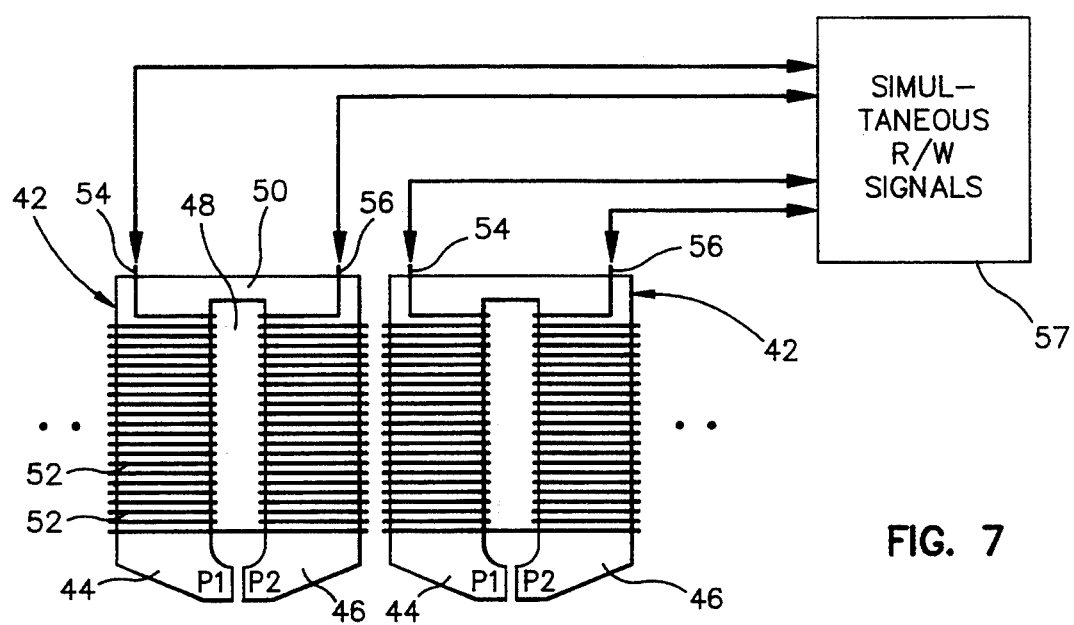
FIG. 7 is a schematic illustration and block diagram of the electrical arrangement for the present invention.
Figure 8:
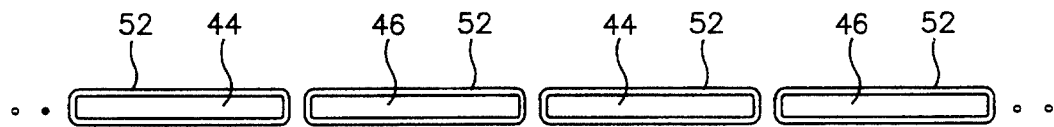
FIG. 8 is a schematic illustration of the conductors coiled about the pole pieces which are employed by the present invention.

FIGS. 2 is a schematic illustration of a linear array of magnetic heads 40 according to the present invention. This linear array includes a plurality of side by side type of thin film magnetic heads 42 which are arranged in a line with a head spacing of D. Each magnetic head 42 includes a pair of pole tips P1T and P2T. The pole tips are arranged in a side-by-side relationship. Sandwiched between the pole tips P1T and P2T is a gap layer G. As shown in FIG. 4, the pole tips P1T and P2T are formed by pole pieces 44 and 46. The pole pieces 44 and 46 are thin film layers which are also arranged in a side-by-side relationship with a space 48 therebetween. The pole pieces 44 and 46 are connected together at 50 to form a back gap. A conductor 52, which is formed from a layer, is coiled about the pole pieces 44 and 46 a number of turns as shown in FIGS. 4, 7 and 8. As shown in FIG. 7, each conductor 52 has terminal ends 54 and 56 which are connected to circuitry 57 which simultaneously writes to all the magnetic heads in the linear array or simultaneously reading to all the magnetic heads in the linear array. The gap-to-gap spacing D of the heads 42 is shown in FIG. 4. This spacing D between the magnetic heads 42 in the linear array shown in FIGS. 4 and 2 may also be called head pitch. As will be explained in more detail hereinafter, the track pitch obtainable by the magnetic heads 42 of FIG. 2 will be substantially less than the head pitch.

Figure 9:
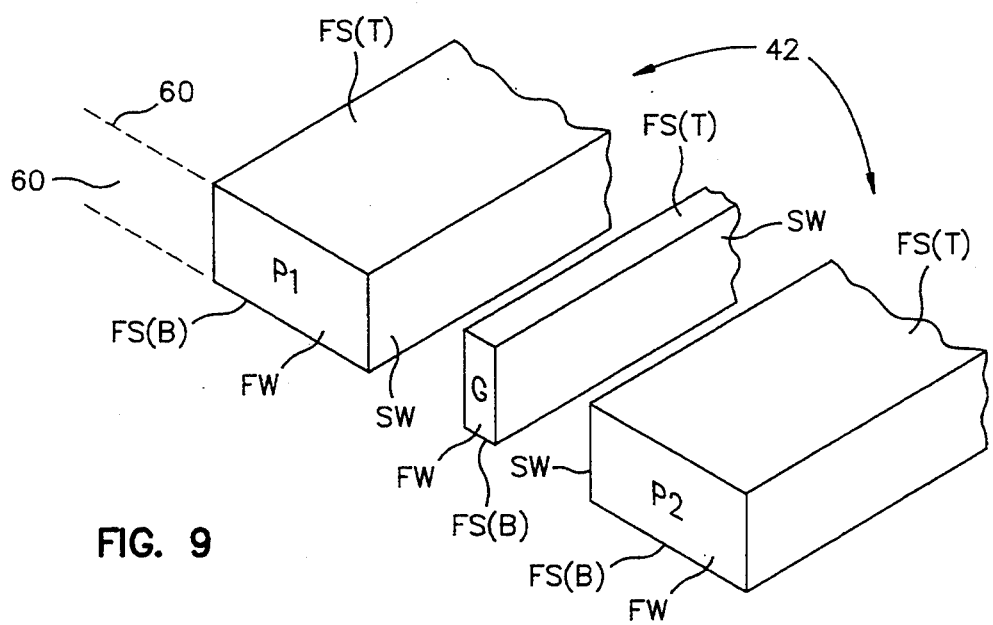
FIG. 9 is an exploded isometric illustration of the pole pieces and gap of a side by side type thin film magnetic head which is employed by the present invention.

FIG. 9 is a schematic isometric exploded illustration of the pole tips P1T and P2T and the gap layer G to explain various details thereof. Each pole tip has top and bottom oppositely facing film surfaces FS(T) and FS(B) respectively which are bounded in part by a front wall FW and a sidewall SW, the front wall FW and the sidewall SW being contiguous with respect to one another. The magnetic head 42 has a gap layer (G) which has top and bottom oppositely facing film surfaces FS(T) and FS(B) which are bounded in part by a pair of oppositely facing sidewalls SW and a front wall FW. The sidewalls of the pole tips P1T and P2T face one another in an opposing relationship. The gap layer G is sandwiched between the pole tips P1T and P2T in a sidewall to sidewall engaging relationship. The front walls of the pole tips P1T and P2T and the front wall of the gap layer G lie in a common plane 60 which forms a portion of an air bearing surface. A complete description of the thin film magnetic head 42 and its construction is disclosed in U.S. Pat. No. 3,662,119 to Lubomyr Romankiw, et al., which patent is incorporated by reference herein.

Figure 10:
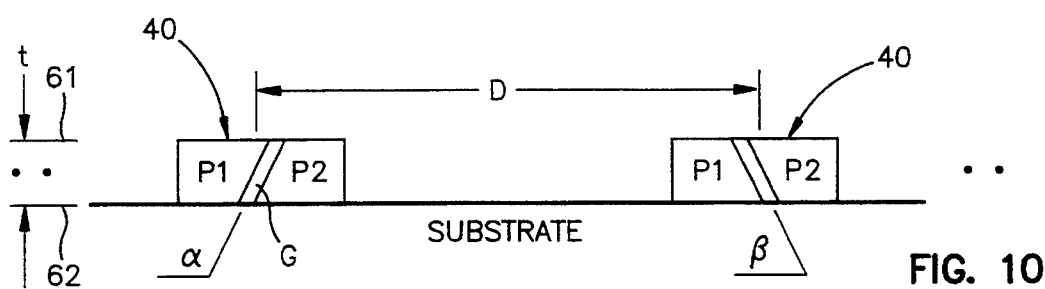
FIG. 10 is a schematic illustration of different azimuth for adjacent thin film magnetic heads in the present line array.
Figure 11:
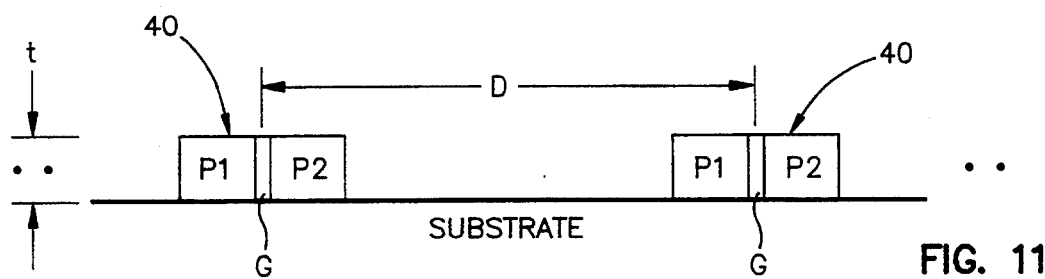
FIG. 11 is a modification of the FIG. 10 embodiment with no azimuth between adjacent heads in the present line array.

As illustrated in FIGS. 10 and 11, provision is made for mounting the magnetic heads 42 in a row on a support member having an air bearing surface, with the front walls of the gap layer G, at the air bearing surface, being spaced a distance D from one another along the longitudinal axis of the row. The distance D establishes the head pitch of the head array. FIG. 10 illustrates a preferred embodiment of the invention and FIG. 11 illustrates an alternative embodiment. In both embodiments, the top and bottom film surfaces of the pole tips P1T and P2T and the gap layer G lie in top and bottom common planes 61 and 62 respectively. The top and bottom planes 61 and 62 are parallel with respect to one another and are spaced from each other by a distance t. The heads are constructed on a support member in the form of a substrate in wafer form by well known photolithography and etching techniques. The heads are held in position in the linear array by the substrate as well as one or more overcoat layers (not shown). The teaching of this invention is to provide as many magnetic heads as there are tracks to read and write plus any additional heads required for extracting servo data from one or more servo tracks.

As stated hereinabove, the preferred embodiment of the invention is illustrated in FIG. 10. In this embodiment adjacent heads are provided with different azimuths. This is accomplished by angling the gap layer G of one of the heads in one direction from a vertical and angling the gap layer G of the adjacent head in an opposite direction from the vertical. More specifically, the sidewalls of each gap layer G of each head are at a non-perpendicular angle with respect to the top and bottom planes 60 and 62. The non-perpendicular angles of adjacent heads along the row of heads are $\alpha, \beta, \ldots \alpha, \beta$ where $\alpha$ and $\beta$ are complimentary angles. With this arrangement, different azimuth is established for adjacent heads along the row of heads which are mirror images of one another. The angles of the azimuth from a vertical can be in a range of 10° to 45°. The azimuth arrangement is important for minimizing cross talk between adjacent tracks on the magnetic medium. No azimuth is provided for the embodiment shown in FIG. 11. In this embodiment cross talk between adjacent tracks will occur unless a guard band is provided therebetween.

In FIG. 12 there is shown an exemplary six tracks designated for tape or disk magnetic media, four of the inside tracks being data tracks and the two outside tracks being servo tracks. The magnetic heads 42 are positioned with the longitudinal axis of the linear array or the row of heads at a skew angle $\theta$ with respect to the longitudinal axis of the tracks so that each head is positioned to read or write a respective track. This provides an intertrack spacing (track pitch) which is equal to D sin $\theta$ where D is the spacing between the magnetic heads 42. The pitch T establishes the track periodicity for the magnetic medium when a plurality of tracks are employed. As seen in FIG. 12, the track pitch T is approximately equal to track width. In typical applications, the higher the data rate the greater the number of data tracks will be required. For HDTV the number of data tracks which may be required ranges between 4 to 32. The present invention can easily handle any number of tracks by simply providing a magnetic head 42 for each track desired on the magnetic medium. Assuming that the media to head velocity is to the right as shown by the arrow at the bottom of FIG. 12, the left head is the first to read or write and the right head is the next or trailing head to read or write. The width of the tracks is generally equal to the thickness t of the individual pole tips P1T and P2T. Track widths in the order of 3 to 4 $\mu$m can be achieved where the thickness of the pole tips P1T and P2T is about 3 $\mu$m, the head spacing D is about 100 $\mu$m and the skew angle $\theta$ is approximately 3°. It should be noted that if the trailing head 42 overwrites track 3 to some extent this will not affect performance of the linear head array because of the azimuth provided by the magnetic heads. Accordingly, if thermal induced track misregistration (TMR) occurs, the azimuth of the heads will maintain high performance of the read and write functions. With the arrangement shown in FIG. 12, guard bands are not required between the data tracks to solve off-track performance problems. If desired, the track pitch T can be reduced by decreasing the skew angle $\theta$. When this is done, the trailing magnetic head will overwrite a portion of the width of track 3. It may be desirable to further reduce the track pitch thereby increasing track periodicity and track density with respect to the magnetic media. Acceptable ranges for D, T and $\theta$ are D in the range of 50–300 $\mu$m, T in the range of 5–30 $\mu$m, and $\theta$ in the range of 1°–5°.

Figure 16:
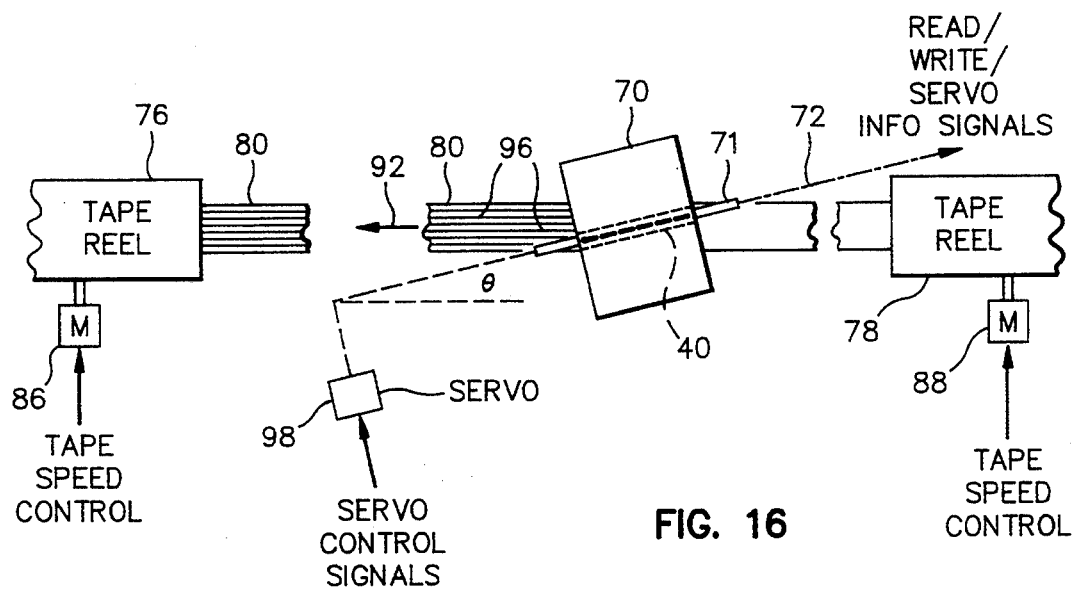
FIG. 16 is a schematic illustration of the drum at a skew angle $\theta$ with respect to the tape, the drum and tape being employed in the magnetic tape drive of FIG. 15.

An exemplary means for positioning the magnetic head line array 40 with respect to a magnetic tape is illustrated in FIGS. 13 and 14. FIG. 13 illustrates a stationary drum 70 which has a shaft 71 located along its central axis 72. A magnetic head linear array 40 is mounted on the drum 70 with its longitudinal axis parallel to the drum axis 72. FIG. 14 illustrates the positioning of the linear array 40 of magnetic heads on the drum 70. In FIG. 15 there is shown a magnetic tape drive 74 which includes the head drum 70 and a pair of reels 76 and 78 for supporting and reeling a tape 80 past the drum 70 for read and write functions. The tape drive 74 interfaces with circuitry 82 for performing read/write/-servo info and control functions and interfaces with circuitry 84 for performing relative tape speed control functions. A more detailed figure of a portion of the tape drive 74 is illustrated in FIG. 16. Motors 86 and 88 are connected to the tape reels 76 and 78 and are responsive to the tape speed control signals for moving the tape 80 past the drum 70.

The longitudinal axis of the magnetic head linear array 40 and the axis 72 of the drum 70 are positioned at the skew angle $\theta$ to the direction of travel of the tape 80 across the drum. Assuming that the direction of travel of the tape 80 is shown by the arrow 92 data will be written in tracks on the tape as shown at 96 in FIG. 16. The four interior heads of each linear array 40 may be data heads and the two outside heads of each linear array may be servo track heads. One or more servo track heads is utilized for detecting misalignment from the skew angle and feeding servo control signals to a servo 98. The servo 98 is mechanically connected to the shaft 71 of the drum for repositioning the drum axis 72 to maintain a constant skew angle $\theta$.

Figure 17:
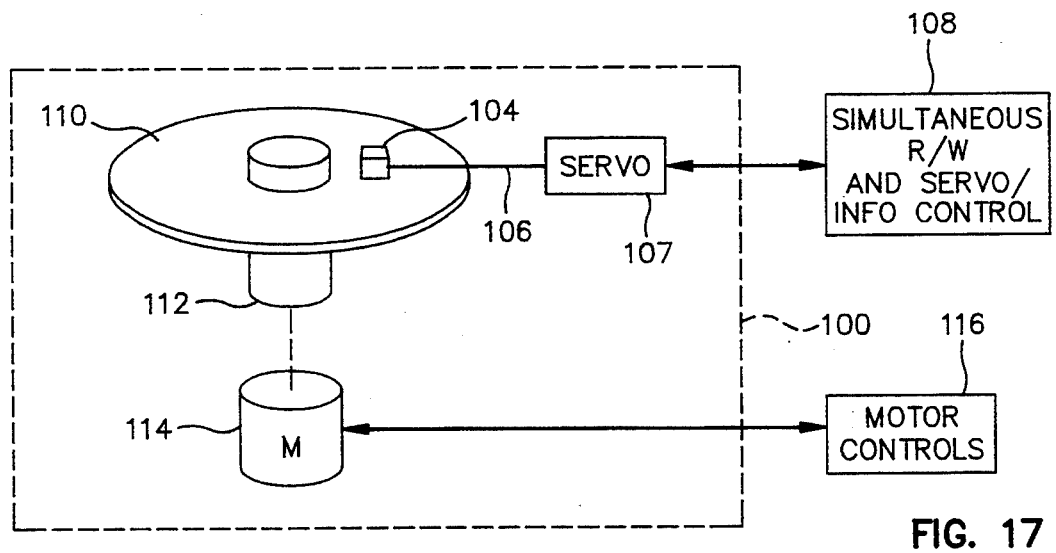
FIG. 17 is a schematic illustration of a magnetic disk drive which employs a slider comprising the present magnetic head linear array.
Figure 18:
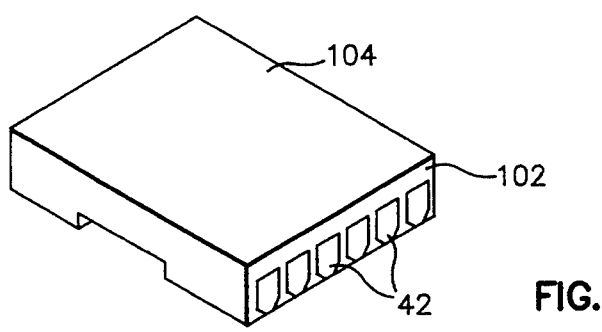
FIG. 18 is a schematic illustration of a number of the present thin film magnetic heads arranged in a linear array in a slider for use with the magnetic disk shown in FIG. 17.

The magnetic head linear array 40 can also be employed with a disk drive 100 as shown in FIG. 17. When a disk drive is employed, the magnetic head linear array 40 is mounted on a side 102 of a slider 104 as shown in FIG. 18. As shown in FIG. 17 the slider 104 is connected to a head suspension assembly 106, thence to a servo 107 and thence to circuitry 108. The circuitry 108 receives servo information from the heads mounted on the slider 104, the heads provide simultaneous read signals or receive simultaneous write signals from the circuitry 108 and the servo 107 appropriately repositions the slider via the head suspension assembly 106 until the magnetic heads on the slider are aligned with tracks on a disk. A magnetic disk 110 is supported by a spindle 112 which is rotated by a motor 114, the motor being controlled by motor control signals from circuitry 116. The servo 107 positions the slider 104 via the head suspension assembly 106 so that the longitudinal axis of the magnetic head linear array 40 is at a skew angle to the direction of the tracks on the magnetic disk 110. Servo control will reposition the slider 104 when needed. In some applications, such as a disk library, multiple disks will be mounted on a spindle. With this arrangement a slider/arm combination is employed for each disk with each slider comprising a magnetic head linear array of the present invention.

Figure 19A:
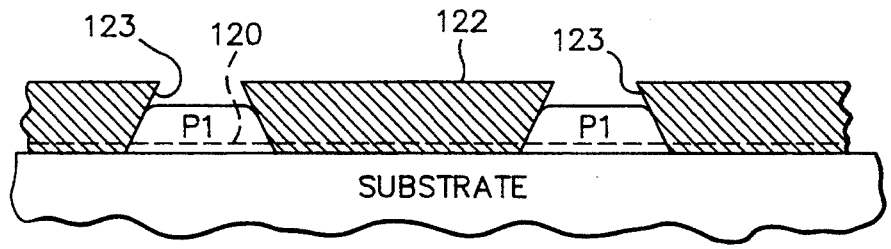
FIGS. 19A–19D are schematic illustrations of the steps involved in fabricating the pole tips P1T and P2T and gap G in the present linear array with different azimuth between adjacent magnetic heads.
Figure 19B:
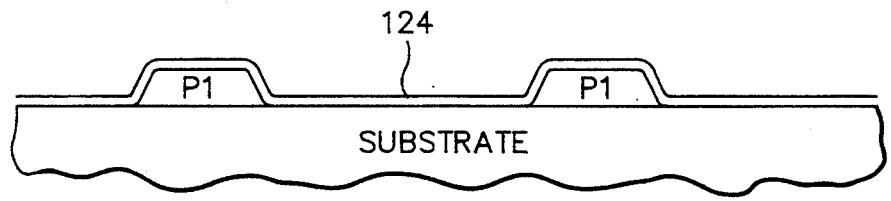
Figure 19C:
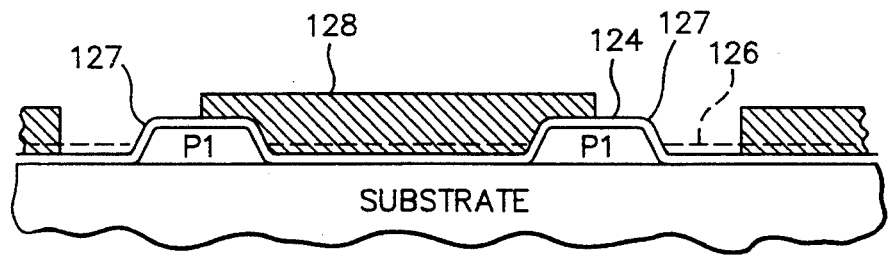
Figure 19D:
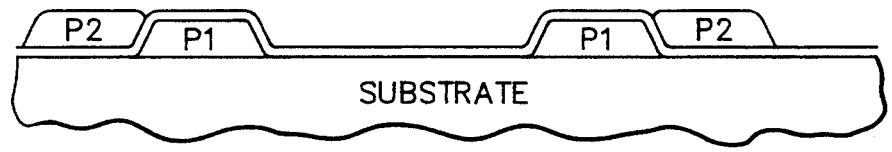

An exemplary process for constructing the FIG. 10 embodiment is shown in FIGS. 19A–19D. As shown in FIG. 19A a seed layer 120 is deposited on the substrate. Through an image reverse photoresist process a photo mask 122 is deposited having tapered edges 123 as shown. A layer forming pole piece P1 is then deposited by a plating process. The photoresist and the seed layer thereunder are then removed. A layer of gap material 124 is then deposited as shown in FIG. 19B. A localized seed layer 126 is then deposited as shown in FIG. 19C. Note that this seed layer is not deposited on the tapered edges 127 of the gap layer 124. Photoresist 128 is then deposited as shown in FIG. 19C. A layer forming pole piece P2 is then plated and the resist 128 is removed to provide the result shown in FIG. 19D. The aforementioned tapered edges can be in the order of 10° from a vertical and still provide good azimuth for preventing cross talk between adjacent tracks.

Figure 20A:
FIGS. 20A–20D are schematic illustrations of the steps involved in fabricating the conductor turns for a single pole piece of a magnetic head which is employed by the present invention.
Figure 20C:
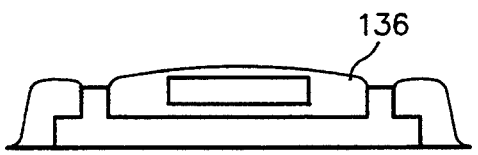
Figure 20B:
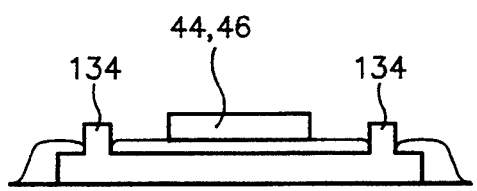
Figure 20D:
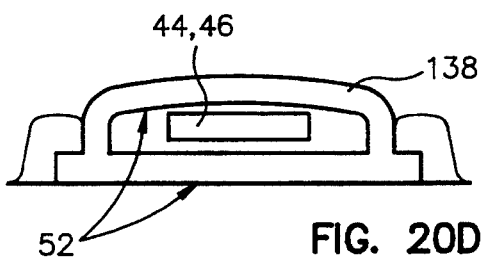

The construction of the layers for the conductor coils 52 about one of the pole pieces 44 or 46 of a magnetic head is shown in FIGS. 20A–20D. A normal photo plating process is employed. A lower coil portion 130 is deposited and then a hardbaked photoresist insulation layer 132 is formed as shown in FIG. 20A. The vertical portions (studs) 134 of the coil and one of the pole pieces 44 or 46 is then formed as shown in FIG. 20B. A hardbaked photoresist insulation layer 136 is formed as shown in FIG. 20C. An upper coil portion 138 is deposited, as shown in FIG. 20D, to complete the entire coil 52. In practice a number of side by side pole pieces and coils are simultaneously formed with pole pieces P1 and P2 being formed as shown in FIGS. 19A–19D.

We claim:

1. A magnetic head array, which has a head surface, comprising:
   a support member, the support member having a surface which forms a part of said head surface;
   a plurality of magnetic heads mounted on the support member;
   each magnetic head having a pair of pole tips P1T and P2T, each pole tip having top and bottom oppositely facing film surfaces which are bounded in part by a front wall and a sidewall, the front wall and the sidewall being contiguous with respect to one another;
   each magnetic head having a gap layer having top and bottom oppositely facing film surfaces which are bounded in part by a front wall;
   the sidewalls of the pole tips P1T and P2T of each pole tip pair facing one another in an opposing relationship;
   each gap layer being sandwiched between the sidewalls of a respective pair of pole tips P1T and P2T;
   the front walls of each pair of pole tips P1T and P2T and the front wall of the respective gap layer sandwiched therebetween lying in a common plane which forms a portion of said head surface; and
   the magnetic heads being mounted on the support member in a row with the front walls of the gap layers at the head surface being spaced a distance D from one another along the longitudinal axis of the row, the distance D establishing the pitch of the head array.

2. A magnetic head array as claimed in claim 1 wherein each head includes:
   first and second pole pieces P1 and P2, each pole piece having a front portion and a back portion;
   the front portion of the first pole piece P1 being the pole tip P1T and the from portion of the second pole piece being the pole tip P2T;
   a conductor coiled a number of turns about the back portion of the first pole piece and coiled a number of turns about the back portion of the second pole piece; and
   the back portions of the first and second pole pieces being magnetically connected together at a location back of the conductor.

3. A magnetic head array as claimed in claim 2 including:
   each conductor having a pair of terminal ends; and
   means connected to the terminal ends of the conductors for feeding read signals simultaneously to the heads or feeding write signals simultaneously to the heads.

4. A magnetic head array as claimed in claim 1 including:
   the top and bottom film surfaces of the pole tips P1T and P2T and the gap layer of the heads lying in top and bottom common planes respectively; and
   the top and bottom common planes being parallel to one another and being spaced from one another by a distance t.

5. A magnetic head array as claimed in claim 4 wherein each magnetic head includes:
   the sidewalls of the gap layer of each head being at a nonperpendicular angle with respect to the top and bottom common planes; and
   the nonperpendicular angles of adjacent heads along the row of heads being $\alpha,\beta, \ldots \alpha,\beta$ where $\alpha$ and $\beta$ are complementary angles, thereby establishing different azimuth for adjacent heads along the row of heads.

6. A magnetic head array as claimed in claim 5 wherein each magnetic head includes:
   first and second pole pieces P1 and P2, each pole piece having a front portion and a back portion;
   the front portion of the first pole piece being the pole tip P1T and the front portion of the second pole piece being the pole tip P2T;
   a conductor coiled a number of turns about the back portion of the first pole piece and coiled a number of turns about the back portion of the second pole piece; and
   the back portions of the first and second pole pieces being magnetically connected together at a location back of the conductor.

7. A magnetic head array as claimed in claim 6 including:
   each conductor having a pair of terminal ends; and
   means connected to the terminal ends of the conductors for feeding read signals simultaneously to the heads or feeding write signals simultaneously to the heads.

8. A magnetic medium drive including the magnetic head array claimed in claim 1, the drive including:
   a magnetic medium;
   a plurality of data tracks extending in a predetermined direction on the magnetic medium;
   means for supporting the magnetic medium;
   means, connected to the support member, for positioning the magnetic heads with the longitudinal axis of the row of magnetic heads at a skew angle $\theta$ to the predetermined direction so that each head is positioned to transduce data in a respective data track of the magnetic medium; and
   the data tracks having a track pitch T which is equal to $D \sin \theta$, the track pitch T establishing a track periodicity for the magnetic medium.

9. A drive as claimed in claim 8 including:
   means connected to the magnetic medium supporting means for moving the magnetic medium relative to the support member; and
   means connected to the positioning means for controlling the position of the magnetic head array relative to the magnetic medium.

10. A drive as claimed in claim 8 including:
    the magnetic medium being a disk.

11. A drive as claimed in claim 8, wherein:
    D being in the range of 50–300 $\mu$m;
    T being in the range of 5–30 $\mu$m; and
    $\theta$ being in the range of 1°–5°.

12. A drive as claimed in claim 8 including:
    the magnetic medium being a tape.

13. A drive as claimed in claim 12 including:
    means connected to the magnetic medium supporting means for moving the magnetic medium relative to the support member; and
    means connected to the positioning means for controlling the position of the magnetic head array relative to the magnetic medium.

14. A drive as claimed in claim 12 wherein each magnetic head includes:
    first and second pole pieces P1 and P2, each pole piece having a from portion and a back portion;
    the front portion of the first pole piece P1 being the pole tip P1T and the front portion of the second pole piece P2 being the pole tip P2T;
    a conductor coiled a number of turns about the back portion of the first pole piece and coiled a number of turns about the back portion of the second pole piece; and
    the back portions of the first and second pole pieces being magnetically connected together at a location back of the conductor.

15. A drive as claimed in claim 12 including:
    first and second pole pieces P1 and P2, each pole piece having a front portion and a back portion;
    the front portion of the first pole piece P1 being the pole tip P1T and the front portion of the second pole piece being the pole tip P2T;
    a conductor coiled a number of turns about the back portion of the first pole piece and coiled a number of turns about the back portion of the second pole piece; and
    the back portions of the first and second pole pieces being magnetically connected together at a location back of the conductor;
    each conductor having a pair of terminal ends; and
    means connected to the terminal ends of the conductors for receiving read signals simultaneously from the heads or providing write signals simultaneously for the heads.

16. A drive as claimed in claim 12 wherein each magnetic head includes:
    the top and bottom film surfaces of the pole tips P1T and P2T and the gap layer of heads lying in top and bottom common planes; and
    the top and bottom common planes being parallel to one another and being spaced from one another a distance t.

17. A drive as claimed in claim 16 wherein each magnetic head includes:
    the sidewalls of the gap layer of each head being at a nonperpendicular angle with respect to the top and bottom common planes; and
    the nonperpendicular angles of adjacent heads along the row of heads being $\alpha,\beta, \ldots \alpha,\beta$ where $\alpha$ and $\beta$ are complementary, thereby establishing different azimuth for adjacent heads along the row of heads.

18. A drive as claimed in claim 17 wherein each magnetic head includes:
    first and second pole pieces P1 and P2, each pole piece having a front portion and a back portion;
    the front portion of the first pole piece being the pole tip P1T and the front portion of the second pole piece being the pole tip P2T;
    a conductor coiled a number of turns about the back portion of the first pole piece and coiled a number of turns about the back portion of the second pole piece; and the back portions of the first and second pole pieces being magnetically connected together at a location back of the conductor.

19. A drive as claimed in claim 18 including:

each conductor having a pair of terminal ends; and means connected to the terminal ends of the conductors for feeding read signals simultaneously to the heads or for feeding write signals simultaneously to the heads.

20. A drive as claimed in claim 19 including:

means connected to the means for supporting the magnetic medium for moving the magnetic medium relative to the support member; and means connected to the means for positioning the magnetic heads for controlling the position of the magnetic head array relative to the tape.

21. A drive as claimed in claim 20, wherein:

D being in the range of 50–300 $\mu$m;

T being in the range of 5–30 $\mu$m; and $\theta$ being in the range of 1°–5°.

22. A magnetic head array comprising:

a plurality of horizontal magnetic heads, each horizontal magnetic head having side by side laterally spaced first and second pole pieces which are laterally separated by a gap at a head surface and magnetically connected at a back gap;

a substrate which has a laterally extending flat surface and an edge surface which are contiguous with respect to one another;

said plurality of horizontal magnetic heads being mounted on the flat surface of the substrate with their head surfaces substantially coplanar with the edge surface of the substrate;

the first and second pole pieces of each head and the pole pieces of said plurality of heads being laterally spaced with respect to one another along the flat surface of said substrate; and the gaps of adjacent horizontal heads being laterally spaced along the flat surface of said substrate a distance D which provides head pitch for the magnetic head array.

23. A magnetic head array as claimed in claim 22 including:

each gap being elongated with a longitudinal axis; and the longitudinal axes of gaps of adjacent horizontal heads being nonparallel to establish different azimuths therebetween.

* * * * *